United States Patent [19]
Kalen

[11] 3,736,633
[45] June 5, 1973

[54] FINISHING DEVICE FOR INTERNAL AND EXTERNAL SURFACES

[75] Inventor: Stuart E. Kalen, Sterling Heights, Mich.

[73] Assignee: Cogsdill Tool Products, Inc., Farmington, Mich.

[22] Filed: Sept. 21, 1971

[21] Appl. No.: 182,360

[52] U.S. Cl. .............................29/90 R, 72/122 R
[51] Int. Cl. .....................B21c 37/30, B24b 39/00
[58] Field of Search .........................29/90; 72/122

[56] References Cited
UNITED STATES PATENTS

| | | | |
|---|---|---|---|
| 3,656,333 | 4/1972 | Kruse, Jr. | 29/90 |
| 3,343,390 | 9/1967 | Harris | 29/90 |
| 3,242,567 | 3/1966 | Adam et al. | 29/90 X |
| 3,559,258 | 2/1971 | Gardner | 29/90 |
| 2,874,452 | 2/1959 | Thompson | 29/90 |

*Primary Examiner*—Harrison L. Hinson
*Attorney*—Harness, Dickey & Pierce

[57] ABSTRACT

The device has an arbor which is driven in rotation for driving a plurality of truncated conical rollers mounted in a cage with internal or external lines of contact with a cylindrical or flat surface. Fluid is delivered through the arbor to a ram having a cylinder element and piston element which are movable relative to each other by the fluid and returned to initial position by spring means for advancing and retracting the rollers. The cage for the rollers is secured to one of the elements while the mandrel or race is secured to the other element so that one is movable relative to the other for increasing or decreasing the diameter on which the rollers operate.

8 Claims, 4 Drawing Figures

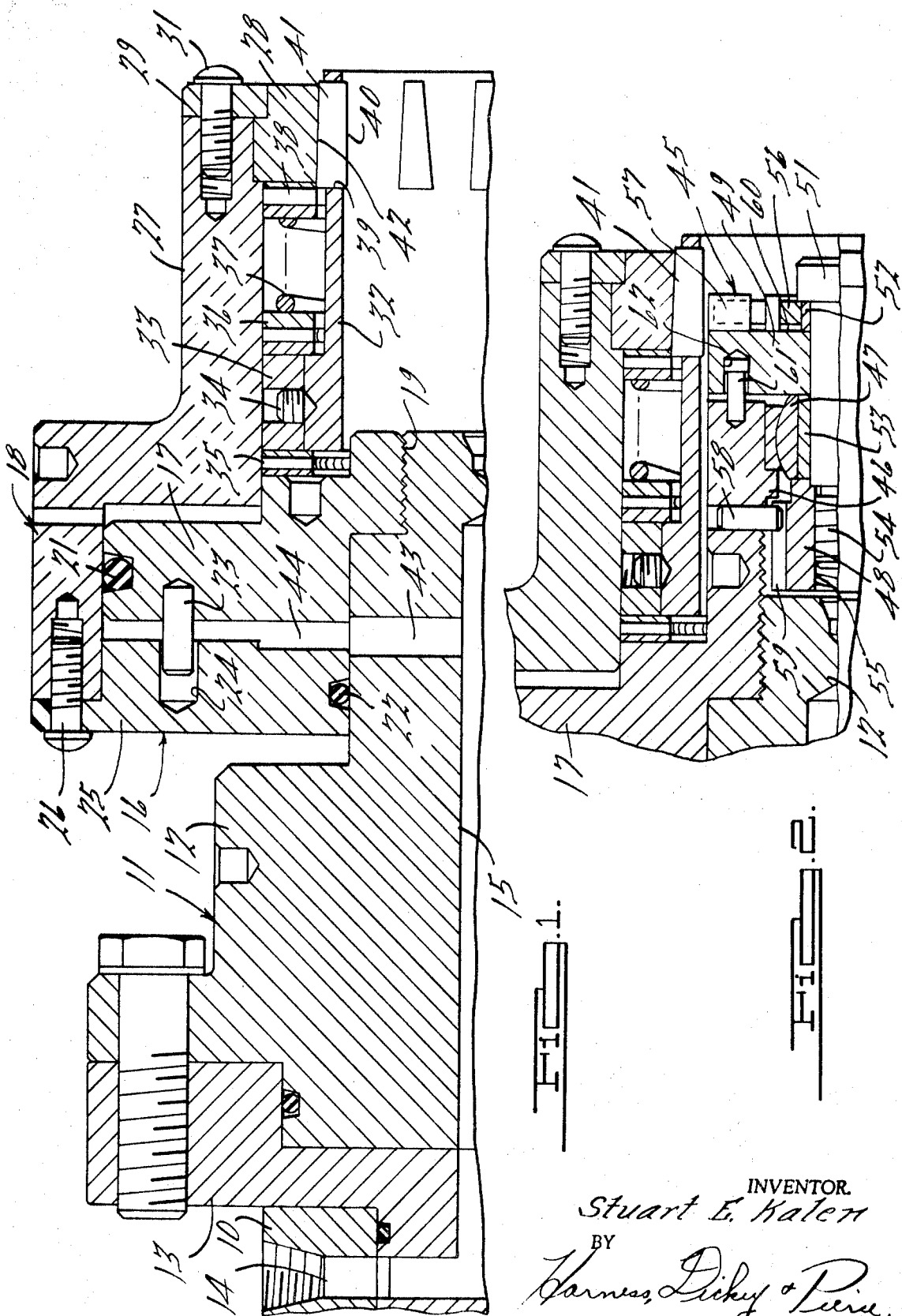

FINISHING DEVICE FOR INTERNAL AND EXTERNAL SURFACES

BACKGROUND OF THE INVENTION

Reference may be had to the patent to W. G. Huber, U.S. Pat. No. 3,320,652 issued May 23, 1967 for "Burnishing Tool" which was assigned to the assignee of the present invention.

RELATED APPLICATIONS

Reference may be had to the application to C. A. Kruse, Jr., Ser. No. 39,246, now U.S. Pat. No. 3,656,333, filed May 21, 1970 for "Cylindrical Surface Finishing Tool" and that to S. E. Kalen, Ser. No. 43,390, now U.S. Pat. No. 3,626,560, filed June 4, 1970, for "Sizing and Finishing Device For External Surfaces."

SUMMARY OF THE INVENTION

The invention pertains to a finishing tool which burnishes the interior or exterior surfaces of a workpiece or a flat end of a cylindrical workpiece to provide a fine finish thereto. An arbor has a passageway for a fluid to a ram carried by the arbor having a cylinder element and a piston element. One of the elements is operated relative to the other by the fluid for advancing a cage and race relative to each other for increasing or decreasing the diameter on which the rollers in the cage are supported. The rollers may be set on a predetermined diameter and the workpiece advanced therethrough as the arbor drives the device in rotation to have the rollers roll on the surface to be finished and advance the cage therewith. The workpiece may be positioned within the rollers and the rollers advanced from a contracted position thereagainst for producing the finishing operation. An additional set of rollers provided in a plane normal to the axis of the arbor contacts the end of the workpiece to finish the end face thereof during the finishing of the adjacent surface of the workpiece. In any of the embodiments, the fluid delivered through the arbor operates an element of the ram relative to the other for moving the rollers inwardly or outwardly of the cage supported by one element and moved relative to the race or mandrel carried by the other element.

BRIEF DESCRIPTION OF THE DRAWINGS

FIG. 1 is a broken sectional view of a tool for producing a finishing operation on the exterior surface of a workpiece embodying features of the present invention;

FIG. 2 is a broken view of the structure illustrated in FIG. 1, with an additional finishing unit embodied therein;

DESCRIPTION OF THE PREFERRED EMBODIMENTS

Figure 3:
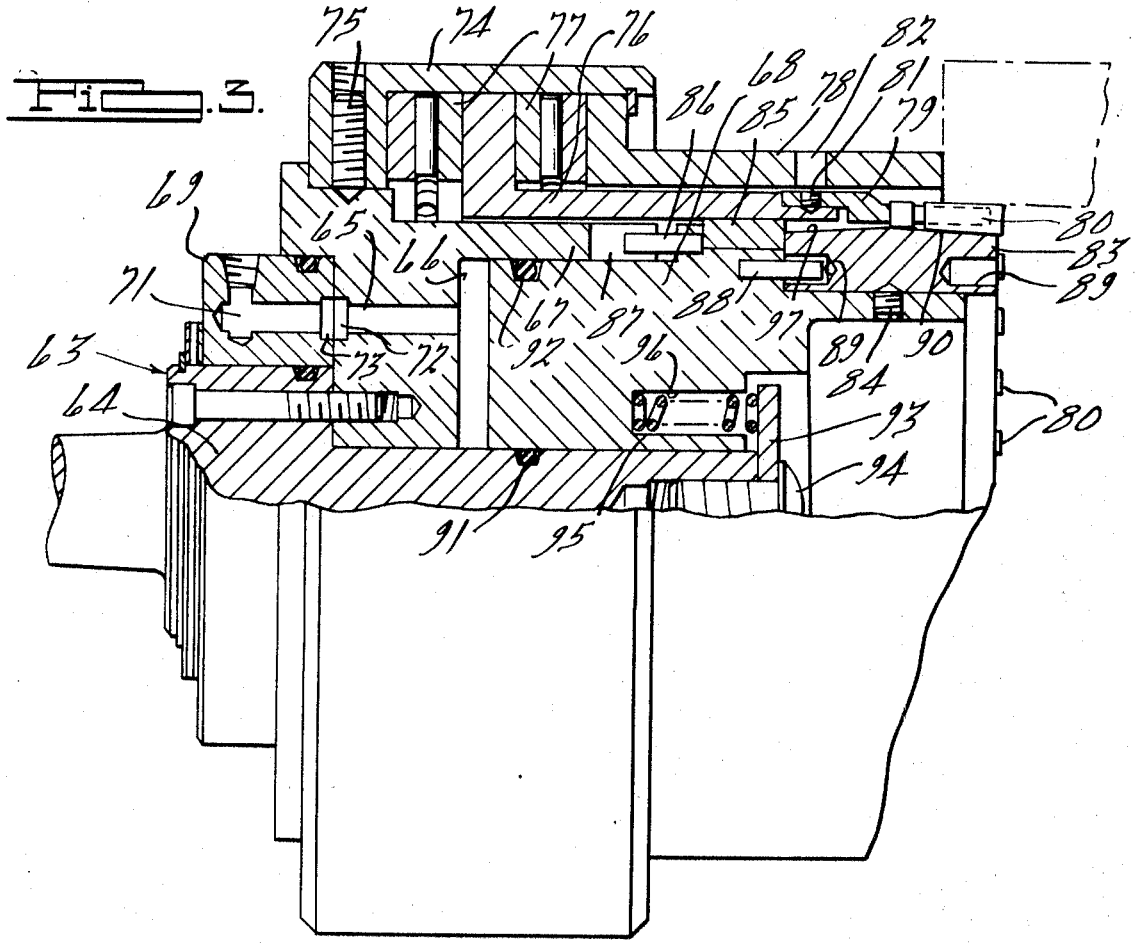
FIG. 3 is a view of structure, similar to that illustrated in FIG. 1, for finishing the interior surface of a workpiece.

Referring to FIG. 1, a finishing tool 11 has an arbor 12 provided with a driving head 13 containing a passageway 15 for fluid from a passageway 14 through a slip ring 10 carried by the arbor. The arbor 12 has a ram 16 supported thereon embodying a piston element 17 and a cylinder element 18. The piston element 17 is secured to the inner end of the arbor 12 by a thread engagement 19. The cylinder element 18 encompasses the piston element 17 and is sealed relative thereto and to the arbor by O-rings 21 and 22. The piston element 17 has a plurality of dowel pins 23 pressfitted thereto in position to extend within apertures 24 in the head 25 of the cylinder element 18 which is driven thereby. The cylinder head 25 is secured to the cylinder element 18 by a plurality of screws 26.

A cylindrical extension 27 on the cylinder element 18 supports a race 28 secured thereto by a ring 29 and a plurality of screws 31. A cylindrical cage 32 has a ring 33 of bronze or other bearing material secured thereto by set screws 34. The cage and rings are mounted between thrust bearings 35 and 36, the latter engaging a spring 37, the opposite end of which bears against a thrust bearing 38 which engages the race 28. The lower end of the cage 32 has truncated conical slots 39 containing truncated conical rollers 41 positioned to have the working engaging lines 40 disposed parallel to each other and to the axis of the arbor. The face 42 of the race or mandrel 28 slopes at an angle to have line engagement with the outer edges of the rollers 41 so as to wedge he rollers outwardly when the cylinder element 18 is moved to the left, as illustrated in the figure, to decrease the diameter of a cylindrical surface upon which the lines 40 of the rollers are positioned.

The introduction of pressure fluid into the passage 15 causes the fluid to pass out of the apertures 43 in the arbor into the space 44 between the cylinder head 25 and the piston elements 17. This causes the movement of the cylinder element 18 to the left and the contraction of the rollers 41 relative to the race 28. A cylindrical workpiece is placed within the area of the rollers 41 and pressure fluid is applied to the cylinder element 18 to cause the roller to engage the surface of the workpiece with a predetermined pressure. The rollers will finish the surface as the arbor is driven in rotation and advanced over the workpiece or the workpiece advanced toward the arbor. By having the rollers 41 disposed at a slight angle of approximately 3°, the workpiece will be advanced thereby into and beyond the rollers. After the finishing operation, the fluid pressure is removed from between the piston and cylinder elements to permit the spring 37 to move the race 28 to the right to permit the rollers 41 to retract.

Referring to FIG. 2, an additional finishing unit 45 is added to the device illustrated in FIG. 1. The piston element 17 has a cylindrical extension 46 which projects beyond the end of the arbor 12. The cylindrical extension has a spherical bearing 47 secured thereto which abuts a ring 48 on the inner end and a washerlike race 49 on the outer end. A shouldered screw 51 clamps a ring 52, the race 49, a sleeve 53 of the bearing 47 and the ring 48 into a unit element through the engagement of a thread 54 of the screw with a thread 55 in the central aperture of the ring 48. The screw 51 also clamps a cylindrical cage 56 which supports necked rollers 57 which are in engagement with the outer face 60 of the race 49.

A plurality of dowel pins 58 have one end pressfitted in the extension 46 with the other end projecting into slots 59 in the outer surface of the ring 48. A plurality of dowel pins 61 are pressfitted in the end of the cylindrical extension 46 in position to project within apertures 62 in the washerlike race 49. This provides a rotary drive relation between the unit 45 supported on the spherical bearing 47 on which it rocks to permit the rollers 57 to adjust themselves to the end face of a workpiece being burnished by the rollers 41. The end face of the workpiece adjacent to the side surface thereof has a fine finish simultaneously produced thereon by the operation of the tool on the workpiece end.

Referring to FIG. 3, a similar tool 63 is illustrated having an arbor 64 through which fluid passageways 65 extend to a ram portion 66 embodying a cylinder element 67 and a piston element 68. The fluid is delivered to the passageway 65 of the arbor by a slip ring 69, made of bronze or other bearing material, having a passageway 71 therethrough. The passageways 71 and 65 communicate with each other through mated annular channels 72 and 73. A cylindrical housing 74 is secured to the cylinder element 67 by set screws 75. A sleeve 76 is rotatably supported within the housing 74 between thrust bearings 77 which also supports a stop sleeve 78 with which the end of the workpiece engages for limiting the advancement thereof. The sleeve 76 has a cylindrical cage 79 secured thereto by a plurality of set screws 81 which are applied and removed through one or more apertures 82 in the wall of the stop sleeve 78.

The cage 79 supports a plurality of rollers 80 which are also of the necked type and are retained within slots in the cage which prevent the rollers from falling outwardly therefrom but which permits them to be expanded outwardly therethrough to a limited degree. In this arrangement, the cage and rollers are supported by the cylinder element 67 through the attachment thereof to the arbor. The piston element 68 has a race or mandrel 83 secured thereby set screws 84. The piston element carries a ring 85 made of bronze or other bearing material which rides on the inner wall of the sleeve 76. The piston element has one end of dowel pins 86 pressfitted therein with the other ends extending within slots 87 in the end of the cylinder 67. The ends of dowel pins 88 are pressfitted in the piston element 68 with the other ends extending within apertures 89 in the inner ends of the race of mandrel 83. The dowel pins produce a rotary drive relation between the arbor and piston element. An O-ring 91 on the arbor seals the inner side of the annular piston element 68 while an O-ring 92 seals the outer side thereof to the inner surface of the cylinder element 67.

A washer 93 is secured to the end of the arbor 64 by a screw 94. A plurality of springs 95 are supported in apertures 96 on the inner end of the piston element 68 with the outer ends of the spring engaged with the inner face of the washer 93 for retracting the piston element after the fluid pressure is removed therefrom. With the rollers 80 in expanded position through their engagement with the sloping surface 90 of the race 83, the end of the internal surface of a workpiece, such as that shown in dot and dash line, is burnished to a fine finish as the arbor is driven in rotation and relatively advanced thereover. The sleeve 78 limits the relative advancement of the workpiece while the rollers finish the adjacent internal surface thereof to a fine finish.

When a different diameter workpiece is to be finished, the cage 79 can be removed from the sleeve 76 by the removal of the set screws 81 and a new cage with different rollers substituted therefor. The race or mandrel 83 is also removed and replaced. The race or mandrel herein illustrated may be turned end for end to have the sloping face portion 97 engage the rollers which correspond to the diameter which is to be finished. By employing different diameter rollers 80 and a mating race or mandrel 83 internal surfaces of different diameters may be finished by the same tool.

Figure 4:
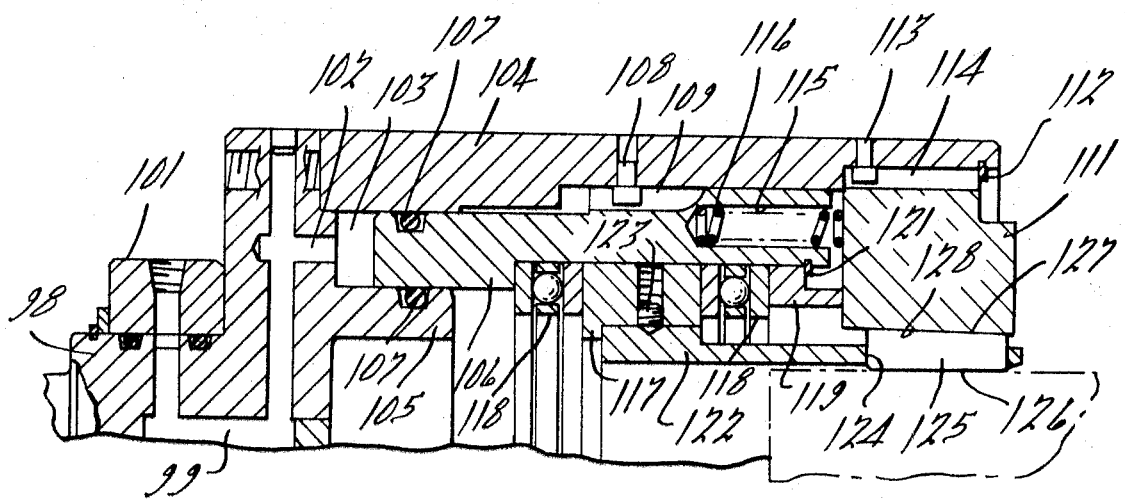
FIG. 4 is a view of structure, similar to that illustrated in FIG. 3, showing a still further form which the invention may assume.

Referring to FIG. 4, a tool similar to that of FIG. 3 is illustrated which operates on the external surface of a workpiece. An arbor 98 has a fluid passageway 99 therethrough to which fluid is delivered from a slip ring 101 of conventional construction. Fluid through passageways 102 enter a ram area 103 composed of outer and inner cylindrical walls 104 and 105 which form the cylinder element of the device. An annular piston element 106 is disposed between the walls 104 and 105 and sealed thereto by O-rings 107. The piston element is driven with the cylinder element by the projections of the heads of pins 108 pressfitted therein into slots 109 in the piston element. A race 111 is supported in the end of the cylindrical wall 104 by a split ring 112. The race 111 is retained in driving relation to the arbor 98 by projecting heads of pins 113 which extend into slots 114 in the edge of the race 111.

The piston element 106 has a plurality of apertures 115 in which springs 116 are retained with the one outer ends abutting the end of the race 111. The inner end of the piston element carries a ring 117, made of bronze or other bearing material, located between a pair of thrust bearings 118 secured together in unit relation by a stop sleeve 119 retained in position by a split ring 121. The ring 117 has a cylindrical cage 122 secured thereto by a plurality of set screws 123. The cage has a plurality of slots 124 for supporting rollers 125 with their internal lines of engagement 126 disposed parallel to each other and to the axis of the arbor. As pointed out above, by slightly tilting the rollers 125 to the axis of the arbor, a workpiece will be automatically fed thereby past the rollers. The inner sloping line 127 of the rollers engage the sloping face 128 of the race 111 which when, the cage 122 is advanced to the right, by the piston element 106 causes the rollers to move inwardly toward the arbor axis in position to receive and operate on the surface of a workpiece. The springs 116 move the piston element 106 to the left when the pressure of fluid is removed therefrom. When a workpiece is to be finished the fluid pressure is applied to the piston element which moves to the position limited by the stop 119 to thereby set the rollers on the diameter to which the workpiece is to be finished. The arbor is then advanced to move the rollers over the workpiece which is retained against rotation. As the arbor is rotated, the rollers roll on the surface of the workpiece as they are relatively advanced thereover. A workpiece of substantial length may have the outer surface finished by the tool as the tool is relatively advanced thereover.

In all the tools herein illustrated, the operation of either the piston element or cylinder element of the ram produces the movement of the rollers to the diameter to which the workpiece is to be finished. The cylinder element or piston element is relatively moved to advance the rollers to work-performing position by the fluid delivered thereto through the passageways provided in the arbor. The ram is supported by the arbor which drives the tool in rotation. The fluid delivered to the ram through the passageways in the arbor produces the working force to finish the workpiece. The retractive force for relatively moving the elements of the ram to their initial position is produced by springs which are compressed during the advancement of the rollers to work-performing position.

I claim:

1. In a finishing tool, an arbor having a fluid passageway therethrough, ram means supported on said arbor, said ram means embodying a piston element and cylinder element movable longitudinally relative to each other by the pressure of said fluid, drive means between said elements to have them rotate as a unit, a cage having slots therein, truncated conical rollers supported in the slots of said cage for inward and outward movement relative thereto, said cage being supported by one of said elements, a race supported by the other of said elements in engagement with said rollers for applying a working pressure thereto when the race and rollers are moved relative to each other by the pressure of said fluid, and spring means between said cage and race for relatively moving them to their initial position when fluid pressure is removed from said ram means.

2. In a finishing tool as recited in claim 1, wherein the cage is a sleeve providing a recess, and the race is a ring having an inner sloping surface engaging the sloping surfaces of the rollers.

3. In a finishing tool as recited in claim 2, wherein a unit member is supported in said recess on a spherical bearing secured to the fixed one of said elements, a race on said unit member having an end face disposed normal to the axis of said arbor, a cage on said unit member adjacent to said end face having a plurality of slots therein, and rollers supported in said slots in engagement with the end face of said race for finishing the end of a workpiece which is having its outer surface finished by said truncated conical rollers.

4. In a finishing tool as recited in claim 3, wherein drive means is provided between said unit member and said fixed one of said elements and between the unit member and said race having the end face to produce the rotation of the unit member with said arbor.

5. In a finishing tool as recited in claim 1, wherein a stop sleeve is supported by said arbor for limiting the advancement of a workpiece relative to said truncated conical rollers.

6. In a finishing tool as recited in claim 5, wherein the cage embodies a cage sleeve and a cage section which supports the rollers, and means for releasably securing the cage section to said cage sleeve for the replacement of the former thereon.

7. In a finishing tool as recited in claim 6, wherein the cage sleeve and section are mounted within the stop sleeve which has an aperture therethrough by which securing means for the cage sleeve and cage section may be released.

8. In a finishing tool as recited in claim 7, wherein connecting means is provided between the piston and cylinder elements which permit their relative movement while producing a rotary drive relation therebetween.

* * * * *